United States Patent [19]
Liu

[11] Patent Number: 5,923,153
[45] Date of Patent: *Jul. 13, 1999

[54] CIRCUIT FOR MODERATING A PEAK REVERSE RECOVERY CURRENT OF A RECTIFIER AND METHOD OF OPERATION THEREOF

[75] Inventor: Rui Liu, Plano, Tex.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/804,554

[22] Filed: Feb. 24, 1997

[51] Int. Cl.$^6$ .................................................. G05F 1/613
[52] U.S. Cl. ............................................. 323/222; 363/59
[58] Field of Search ..................... 323/222, 282, 323/283, 351, 290; 363/52, 89, 59

[56] References Cited

U.S. PATENT DOCUMENTS

| | | | |
|---|---|---|---|
| 5,307,004 | 4/1994 | Carsten | 323/222 |
| 5,313,382 | 5/1994 | Farrington | 363/16 |
| 5,414,613 | 5/1995 | Chen | 363/52 |
| 5,461,302 | 10/1995 | Garcia et al. | 323/222 |
| 5,477,131 | 12/1995 | Gegner | 323/222 |
| 5,486,752 | 1/1996 | Hua et al. | 323/222 |
| 5,633,579 | 5/1997 | Kim | 323/222 |

OTHER PUBLICATIONS

"A Comparison of Voltage Mode Soft Switching Methods for PWM Converters" by K. Mark Smith and Keyue M. Smedley; 1996 IEEE; pp. 291–298.

"High Efficiency Telecom Rectifier Using a Novel Soft-Switched Boost–Based Input Current Shaper" by Robert Streit and Daniel Tollik; 1991 IEEE; Nov. 1991; pp. 720–726.

"Novel Zero–Voltage–Transition PWM Converters" by Guichao Hua, Ching–Shan Leu, and Fred C. Lee; 1992 IEEE; pp. 55–61.

"Soft Transitions Power Factor Correction Circuit" by Ionel Dan Jitaru; May 1993; pp. 202–208.

*Primary Examiner*—Adolf Danske Berhane

[57] ABSTRACT

In a power converter having a power train that includes a power switch and a rectifier for conducting forward currents from the power switch, a circuit for, and method of, moderating a peak reverse recovery current of the rectifier and a power converter employing the circuit or the method. The circuit includes: (1) a snubber circuit coupled to the rectifier and including a snubber inductor, a snubber capacitor and an auxiliary diode, the snubber inductor reducing the peak reverse recovery current of the rectifier and the snubber capacitor recovering energy stored in the snubber inductor and (2) an auxiliary switch, coupled in parallel with the power switch, that is activated when the power switch is transitioned from a conducting state to a non-conducting state to charge the snubber capacitor.

20 Claims, 4 Drawing Sheets

FIG. 6A   Vgs1
FIG. 6B   Vgs2
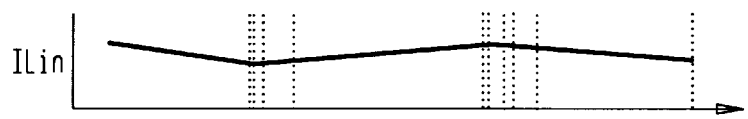
FIG. 6C   ILin
FIG. 6D   Ids,Vds Vo
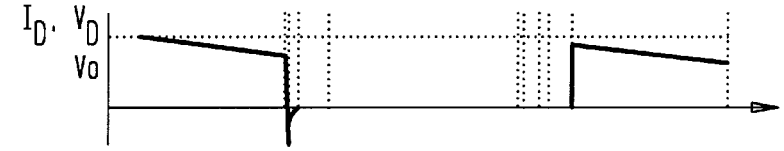
FIG. 6E   $I_D$, $V_D$ Vo
FIG. 6F   ILr
FIG. 6G   Ida1
FIG. 6H   Ida2
FIG. 6I   Vcr
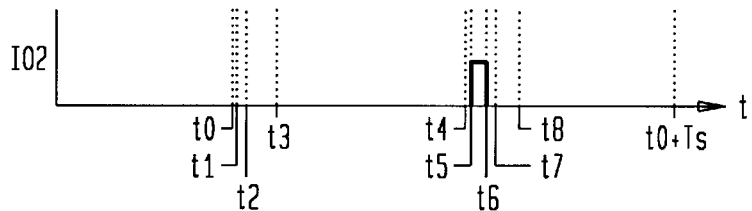
FIG. 6J   Io2

CIRCUIT FOR MODERATING A PEAK REVERSE RECOVERY CURRENT OF A RECTIFIER AND METHOD OF OPERATION THEREOF

TECHNICAL FIELD OF THE INVENTION

The present invention is directed, in general, to power supplies and, more specifically, to a circuit for moderating a peak reverse recovery current of a rectifier and a method of operation thereof.

BACKGROUND OF THE INVENTION

A power converter is a power processing circuit that converts an input voltage waveform into a specified output voltage waveform. A switched-mode power converter is a frequently employed power converter that converts an input voltage waveform into a specified output voltage waveform. A boost power converter is one example of a switched-mode converter that converts the input voltage to an output voltage that is greater than the input voltage. Typically, the boost power converter is employed in off-line applications wherein power factor correction is required and a stable regulated voltage is desired at the output of the power converter.

A non-isolated boost power converter generally includes an energy storage device (e.g., an inductor) coupled between the input voltage and an inverter or switching device. The switching device is then coupled to a rectifier (e.g., a power diode) and an output capacitor. The load is connected in parallel to the capacitor. Again, the output voltage (measured at the load) of the boost power converter is always greater than the input voltage. When the switching device is conducting, the diode is reverse biased thereby isolating the output stage. During this period, the input voltage supplies energy to the inductor. When the switching device is not conducting, the output stage receives the energy stored in the inductor for delivery to the load coupled to the output of the converter.

Analogous to all types of power converters, a boost converter is subject to inefficiencies that impair the overall performance of the power converter. More specifically, the rectifying diode suffers from a reverse recovery condition thereby producing excessive power losses in both the rectifying diode and the switching device and oscillations in both current and voltage therefrom. The effect of the reverse recovery condition is more severe in non-isolated converters, such as the boost power converter, due to the low impedance across the input voltage source during the commutation of the rectifying diode. The reverse recovery condition can also detrimentally affect the longevity of the components, especially the rectifying diode and switching device, of the boost power converter. Therefore, efforts to minimize the losses associated with the rectifier and switching device and, more specifically, with the rectifying diode will improve the overall performance of the power converter.

A traditional manner to reduce the losses associated with the rectifying diodes is to introduce a snubber circuit coupled to the rectifying diodes. Snubber circuits are generally employed for various functions including to minimize overcurrents and overvoltages across a device during conduction and non-conduction periods and to shape the device switching waveforms such that the voltage and current associated with the device are not concurrently high. For instance, with respect to rectifying diodes, a snubber circuit may be employed to minimize oscillations in both voltage and current and power losses associated therewith due to reverse recovery current resulting from a snap-off of the rectifying diode during a transition from a conduction to non-conduction mode of operation.

Snubber circuits are well known in the prior art. One approach to reduce the reverse recovery current of the rectifying diode is to employ a snubber circuit that includes an inductor in series with the rectifying diode. This type of lossless snubber circuit attempts to recovery the energy stored in the snubber inductor during the reverse recovery period of the rectifying diode for delivery to the output of the converter. While the lossless inductor snubber provides an alternative for reducing the reverse recovery current of the rectifying diode, for reasons that will become more apparent there are tradeoffs in the selection of the inductor and auxiliary components of the lossless snubber that detract from the advantages of employing such a snubber circuit.

Accordingly, what is needed in the art is a circuit that moderates a peak reverse recovery current of a rectifier that maintains the advantages associated with lossless snubber circuits, but overcomes the contradictions presently available in the design thereof.

SUMMARY OF THE INVENTION

To address the above-discussed deficiencies of the prior art, the present invention provides, in a power converter having a power train that includes a power switch and a rectifier for conducting forward currents from the power switch, a circuit for, and method of, moderating a peak reverse recovery current in the rectifier and a power converter employing the circuit or the method. The circuit includes: (1) a snubber circuit coupled to the rectifier and including a snubber inductor, a snubber capacitor and an auxiliary diode, the snubber inductor reducing the peak reverse recovery current of the rectifier and the snubber capacitor recovering energy stored in the snubber inductor and (2) an auxiliary switch, coupled in parallel with the power switch, that is activated when the power switch is transitioned from a conducting state to a non-conducting state to charge the snubber capacitor. The snubber capacitor thereby may recover a lesser amount of energy to divert forward currents from the auxiliary diode to the snubber inductor.

The peak reverse recovery current of the rectifier is reduced by coupling a snubber inductor in series with the rectifier. A snubber capacitor is added to recover the energy stored in the snubber inductor during the reverse recovery period of the rectifier. However, there is a inherent contradiction in the selection of the snubber inductor and snubber capacitor of the snubber circuit. The larger the value of the snubber inductor, the smaller the peak reverse recovery current. Additionally, it is necessary that a sufficient amount of energy is transferred to the snubber capacitor so that the auxiliary diode of the snubber circuit does not conduct the forward currents after the turn-off transient of the power switch. The larger amount of energy transferred to and recovered by the snubber capacitor, however, constrains the value of the snubber inductor to a smaller inductance. The present invention therefore introduces an auxiliary switch that allows the value of the snubber inductor to increase. Because the value of the snubber inductor is allowed to increase, the peak reverse recovery current of the rectifier can be reduced.

In one embodiment of the present invention, the auxiliary switch is deactivated following expiration of a predetermined period of time. Alternatively, the auxiliary switch is deactivated upon the occurrence of some event, such as a detected voltage level.

In one embodiment of the present invention, the snubber circuit further includes another (or second) auxiliary diode for conducting the forward currents prior to the snubber capacitor being fully discharged. The advantages provided by the second auxiliary diode will become more apparent with a description of the circuit of the present invention in the environment of a power converter that follows.

In one embodiment of the present invention, the power switch is an insulated gate bipolar transistor ("IGBT") that exhibits a tail current that causes switching losses in the IGBT, the auxiliary switch altering a voltage across the IGBT to reduce the switching losses. While IGBTs offer many advantages (such as high power handling capability and the ability to operate under high voltage stresses), the switching losses at turn-off due, in pertinent part, to the tail current are one of the primary reasons that prevent the use of IGBTs at high frequencies (e.g., above 50 kHz). The auxiliary switch alters a voltage across the IGBT to ultimately reduce the switching losses associated therewith. Of course, the broad scope of the present invention is not limited to the type of power switch employable therewith.

In one embodiment of the present invention, the rectifier includes a power diode. Of course, the broad scope of the present invention is not so limited.

In one embodiment of the present invention, the circuit further includes a resistor that discharges a voltage across the auxiliary switch when the auxiliary switch is in a non-conducting state. In another embodiment, the circuit further includes a Zener diode that recovers energy from the auxiliary switch to the snubber capacitor when the auxiliary switch is in a non-conducting state.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 6a–j illustrates voltage and current characteristics of the operation of selected components of the boost power converters of FIGS. 3–5;

DETAILED DESCRIPTION

Figure 1:
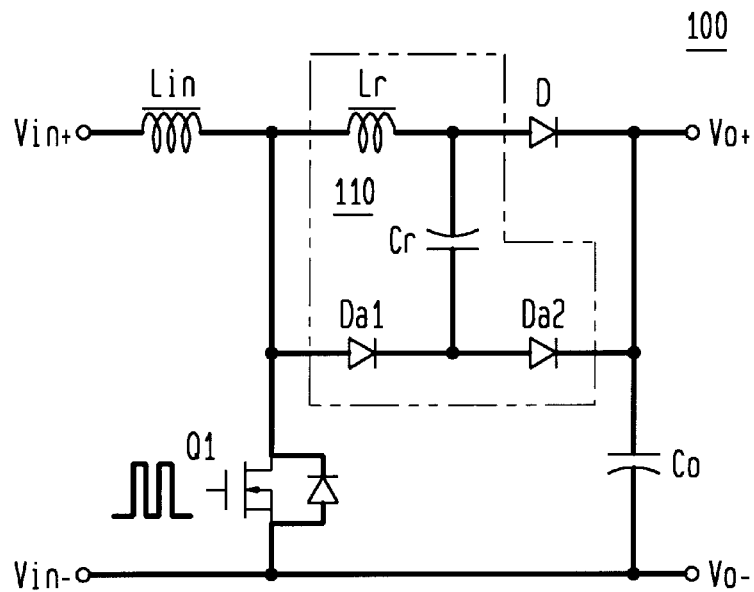
FIG. 1 illustrates a schematic diagram of boost power converter employing a prior art snubber circuit.

Referring initially to FIG. 1, illustrated is a schematic diagram of boost power converter (or boost converter) 100 employing a prior art snubber circuit 110. The boost converter 100 includes an input voltage source $V_{in}$, an input inductor $L_{in}$, a power switch Q1, a power diode D, an output capacitor $C_o$ and the snubber circuit 110. The boost converter 100 provides a voltage $V_o$ at the output thereof. The snubber circuit 110 includes a snubber inductor $L_r$, a snubber capacitor $C_r$, and a first and second auxiliary diode $D_{a1}$, $D_{a2}$.

The operation of the boost converter is hereinafter described. When the power switch Q1 is conducting, the forward currents flow from the input voltage source $V_{in}$ through the input inductor $L_{in}$. When the power switch Q1 is turned off, the first and second auxiliary diodes $D_{a1}$, $D_{a2}$ begin conducting the forward currents and the snubber capacitor $C_r$ (which is previously charged with a positive polarity between the first and second auxiliary diodes $D_{a1}$, $D_{a2}$) is connected in parallel with the snubber inductor $L_r$ due to the conduction of the first auxilary diode $D_{a1}$. The energy stored in the snubber capacitor $C_r$ is transferred to the snubber inductor $L_r$ in a resonant manner. During this period, the current in the snubber inductor $L_r$ is built up and the current in the first auxilary diode $D_{a1}$ is decreasing because the sum of the two currents is equal to the current in the input inductor $L_{in}$. Additionally, the first auxilary diode $D_{a1}$ is off and the remainder of the energy in the snubber capacitor $C_r$ is delivered to the output of the boost converter 100 through the second auxiliary diode $D_{a2}$.

When the snubber capacitor $C_r$ is substantially discharged, the power diode D is turned on and the second auxiliary diode $D_{a2}$ is turned off. Consequently, the energy stored in the input inductor $L_{in}$ is transferred to the output of the boost converter 100 through the snubber inductor $L_r$ and the power diode D. If there is not enough energy stored in the snubber capacitor $C_r$, the first auxilary diode $D_{a1}$ may not be in a conducting state when the power switch Q1 is transitioned from the non-conducting to the conducting state. As a result, high switching losses associated with the power switch Q1 due to the reverse recovery currents the first auxilary diode $D_{a1}$ may occur.

When the power switch Q1 is transitioned from the non-conducting to the conducting state, the snubber inductor $L_r$ limits a change in current over time ("di/dt") of the current associated with the power diode D. As a result of the reduced di/dt, the amplitude of the reverse recovery current of the power diode D is also reduced. Simultaneously, the current conducting through the power switch Q1 during the transition is delayed thereby eliminating the switching losses associated with the reverse recovery current of the power diode D. The energy contained in the snubber inductor $L_r$ is transferred through the first auxiliary diode $D_{a1}$ to the snubber capacitor $C_r$ and clamps the voltage swing across the power diode D.

The snubber circuit 110 therefore reduces the switching losses of the power switch Q1 by substantially eliminating the switching losses caused by the reverse recovery current of the power diode D. However, for reasons that will hereinafter become more apparent, the snubber circuit 110 does not adequately resolve the inherent contradiction between the selection of the snubber inductor $L_r$ and the snubber capacitor $C_r$.

Figure 2:
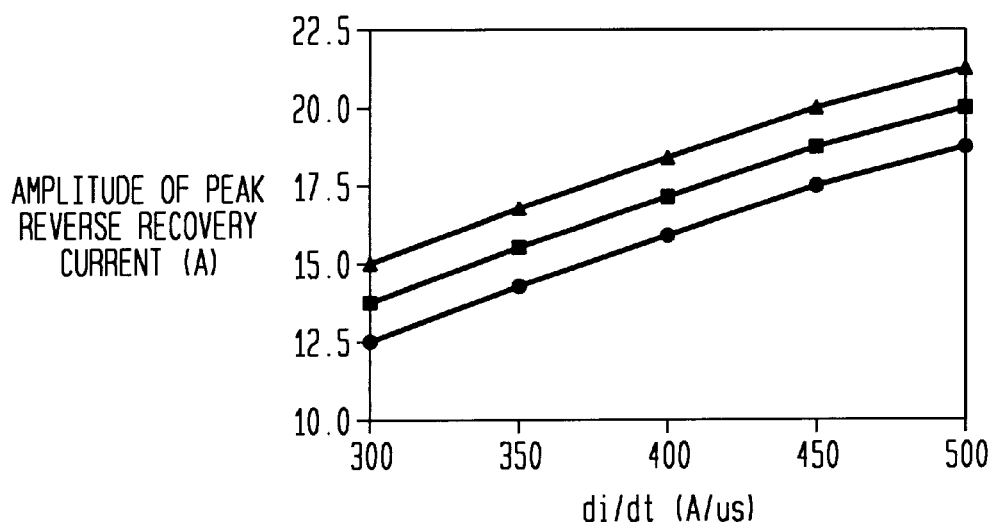
FIG. 2 illustrates a waveform of the peak recovery current verses the change in current over time for a rectifying diode employable in the boost power converter of FIG. 1.

Turning now to FIG. 2, illustrated is a waveform of the peak recovery current verses the change in current over time ("di/dt") for rectifier (e.g., a power diode D) employable in the converter of FIG. 1. It is evident from the illustrated waveform that the smaller the di/dt, the smaller the amplitude of the peak reverse recovery current. Again, the snubber inductor $L_r$ limits the di/dt and therefore ultimately reduces the amplitude of the reverse recovery current of the power diode D. In other words, the larger the impedance provided by the snubber inductor $L_r$, the smaller the reverse recovery current.

However, it is necessary for the proper operation of the snubber circuit 110 that a sufficient amount of energy is recovered by the snubber capacitor $C_r$ so that the first and second auxiliary diodes $D_{a1}$, $D_{a2}$ do not conduct the forward currents after the turn-off transient of the power switch $Q_1$. The contradiction materializes because for a sufficient amount of energy to be transferred to and recovered by the snubber capacitor $C_r$, the snubber inductor $L_r$ should be smaller. Thus, for the snubber circuit 110 to operate properly the snubber inductor $L_r$ must be downsized thereby degrading its ability to reduce the peak reverse recovery current of the power diode D. Stated another way, the peak reverse recovery current must be equal to or greater than the forward current at the instant when the power switch Q1 is turned-off to ensure a proper operation of the snubber circuit 110. Again, this is contradictory to the function of the snubber circuit 110.

Figure 3:
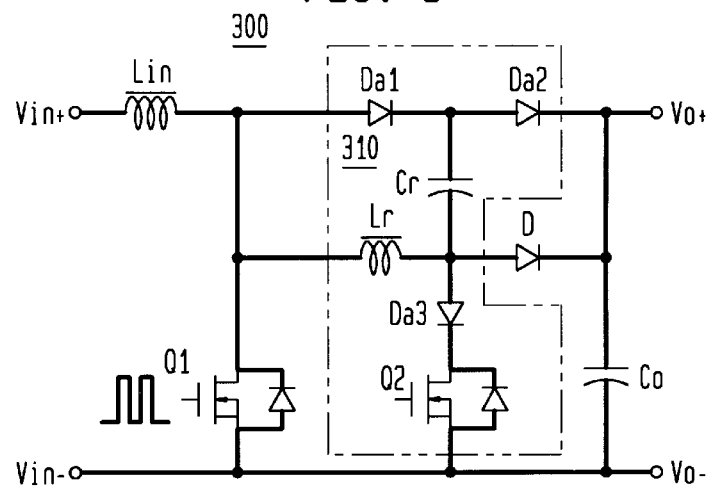
FIG. 3 illustrates a schematic diagram of an embodiment of a boost power converter employing an embodiment of a circuit constructed according to the principles of the present invention.

Turning now to FIG. 3, illustrated is a schematic diagram of an embodiment of a boost power converter (or boost converter) 300 employing an embodiment of a circuit 310 constructed according to the principles of the present invention. The boost converter 300 includes an input voltage source $V_{in}$, an input inductor $L_{in}$, a power switch Q1 [e.g., a metal-oxide semiconductor field-effect transistor ("MOSFET")], a rectifier (e.g., a power diode D), an output filter (e.g., an output capacitor $C_o$) and the circuit 310. The boost converter 300 provides a voltage $V_o$ at the output thereof. The circuit 310 includes a snubber circuit (including a snubber inductor $L_r$, a snubber capacitor $C_r$, and a first, second and third auxiliary diode $D_{a1}$, $D_{a2}$, $D_{a3}$) and an auxiliary switch Q2. For reasons that will hereinafter become more apparent, the circuit 310 resolves the inherent contradiction between the selection of the snubber inductor $L_r$ and the snubber capacitor $C_r$.

Figure 4:
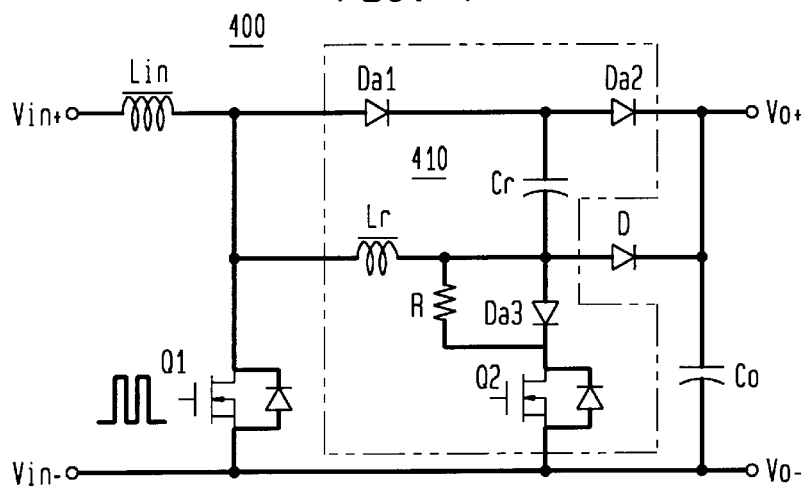
FIG. 4 illustrates a schematic diagram of an embodiment of a boost power converter employing another embodiment of a circuit constructed according to the principles of the present invention.

Turning now to FIG. 4, illustrated is a schematic diagram of an embodiment of a boost power converter (or boost converter) 400 employing another embodiment of a circuit 410 constructed according to the principles of the present invention. The boost converter 400 includes an input voltage source $V_{in}$, an input inductor $L_{in}$, a power switch Q1, a rectifier (e.g., a power diode D), an output filter (e.g., an output capacitor $C_o$) and the circuit 310. The boost converter 300 provides a voltage $V_o$ at the output thereof. The circuit 310 includes a snubber circuit (including a snubber inductor $L_r$, a snubber capacitor $C_r$ a first, second and third auxiliary diode $D_{a1}$, $D_{a2}$, $D_{a3}$ and a resistor R) and an auxiliary switch Q2. For reasons that will hereinafter become more apparent, the circuit 410 resolves the inherent contradiction between the selection of the snubber inductor $L_r$ and the snubber capacitor $C_r$.

Figure 5:
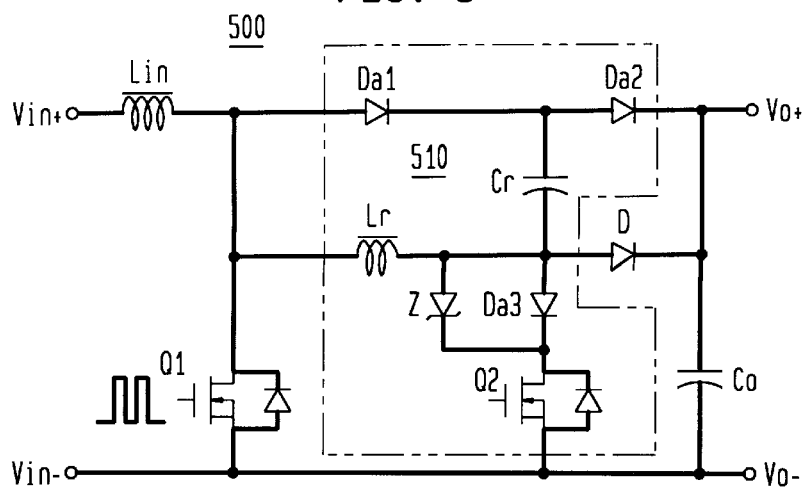
FIG. 5 illustrates a schematic diagram of an embodiment of a boost power converter employing another embodiment of a circuit constructed according to the principles of the present invention.

Turning now to FIG. 5, illustrated is a schematic diagram of an embodiment of a boost power converter (or boost converter) 500 employing another embodiment of a circuit 510 constructed according to the principles of the present invention. The boost converter 500 includes an input voltage source $V_{in}$, an input inductor $L_{in}$, a power switch Q1, a rectifier (e.g., a power diode D), an output filter (e.g., an output capacitor $C_o$) and the circuit 310. The boost converter 300 provides a voltage $V_o$ at the output thereof. The circuit 310 includes a snubber circuit (including a snubber inductor $L_r$, a snubber capacitor $C_r$, a first, second and third auxiliary diode $D_{a1}$, $D_{a2}$, $D_{a3}$ and a Zener diode Z) and an auxiliary switch Q2. For reasons that will hereinafter become more apparent, the circuit 510 resolves the inherent contradiction between the selection of the snubber inductor $L_r$ and the snubber capacitor $C_r$.

Turning now to FIGS. 6A–6J, illustrated are voltage and current characteristics as a function of time ("t") for the operation of selected components of the boost converters 300, 400, 500 of FIGS. 3–5. FIG. 6A illustrates the gate-to-source voltage characteristic $V_{gs1}$ of the power switch Q1. FIG. 6B illustrates the gate-to-source voltage characteristic $V_{gs2}$ of the auxiliary switch Q2. FIG. 6C illustrates the current characteristic $I_{Lin}$ of the input inductor $L_{in}$. FIG. 6D illustrates the drain-to-source current and voltage $I_{ds}$, $V_{ds}$ characteristics of the power switch Q1 as a function of the voltage $V_o$ at the output of the boost converters 300, 400, 500. FIG. 6E illustrates the drain current and voltage characteristics $I_D$, $V_D$ of the power switch Q1 as a function of the voltage $V_o$ at the output of the boost converters 300, 400, 500. FIG. 6F illustrates the current characteristic $I_{Lr}$ of the snubber inductor $L_r$. FIG. 6G illustrates the current characteristic $I_{da1}$ of the first auxiliary diode $D_{a1}$. FIG. 6H illustrates the current characteristic $I_{da2}$ of the second auxiliary diode $D_{a2}$. FIG. 6I illustrates the voltage characteristic $V_{Cr}$ of the snubber capacitor $C_r$. FIG. 6J illustrates the current characteristic $I_{Q2}$ of the auxiliary switch Q2.

With continuing reference to FIGS. 3–5 and 6A–6J, the boost converters 300, 400, 500 generally operates as follows. Assume that the current $I_{Lin}$ for the input inductor $L_{in}$ is conducted by the power diode D prior to a time $t_0$. At the time $t_0$, the power switch Q1 is transitioned from a non-conducting state to a conducting state and the power diode D continues conducting. The drain-to-source voltage $V_{ds1}$ is discharged to zero through the power switch Q1. Also, the voltage across the snubber inductor $L_r$ is equal to the output voltage $V_o$ and the discharging rate of the current $I_{Lr}$ is determined by the inductance value of the snubber inductor $L_r$. Thus, a large value for the snubber inductor $L_r$ results in a small di/dt and, consequently, a small peak reverse recovery current. At a time $t_1$, the peak reverse recovery current reaches its maximum value.

During a reverse recovery period (the period between a time $t_1$ and a time $t_2$) of the power diode D, the voltage $V_D$ across the power diode D starts to build-up and the drain-to-source voltage $V_{ds2}$ across the auxiliary switch Q2 begins to discharge (note: in the boost converters 400, 500 of FIGS.

4 and 5, the drain-to-source voltage $V_{ds2}$ is discharged through the resistor R and the Zener diode Z, respectively; when employing the Zener diode Z, the energy may be recovered from the auxiliary switch Q2 to the snubber capacitor $C_r$). The first auxiliary diode $D_{a1}$ begins conducting at the time $t_1$ to transfer the energy stored in snubber inductor $L_r$ to the snubber capacitor $C_r$. As a result, the reverse recovery energy stored in the snubber inductor $L_r$ is recovered by the snubber capacitor $C_r$. The reverse recovery period of the power diode D is completed at the time $t_2$ corresponding to a time when the drain-to-source voltage $V_{ds2}$ of the auxiliary switch Q2 is completely discharged to zero.

During the period between a time $t_2$ and a time $t_3$, the process of recovering the energy stored in the snubber inductor $L_r$ to the snubber capacitor $C_r$ proceeds until the time $t_3$ at which time the current $I_{Lr}$ of the snubber inductor $L_r$ reaches zero and the first auxiliary diode $D_{a1}$ turns off. During this interval, the drain-to-source voltage $V_{ds2}$ of the auxiliary switch Q2 builds-up negatively and substantially equals the voltage $V_{Cr}$ across the snubber capacitor $C_r$. The value of the snubber capacitor $C_r$ should be preferably selected such that the recovery process concludes before the power switch Q1 is transitioned from a conducting to a non-conducting state.

During a linear charge-up of the input inductor $L_{in}$ stage (the period between a time $t_3$ and a time $t_4$), the current $I_{Lin}$ of the input inductor $L_{in}$ is linearly charged-up until the power switch Q1 is transitioned from the conducting to the non-conducting state at the time $t_5$. Concurrently, during a transition the auxiliary switch Q2 into a conducting state period (the period between a time $t_4$ and a time $t_5$), the current $I_{Lin}$ of the input inductor $L_{in}$ is conducted by the auxiliary switch Q2 until the power switch Q1 is transitioned to the non-conducting state at the time $t_5$.

At the transition period for the power switch Q1 to the non-conducting state, the auxiliary switch Q2 conducts the current $I_{Lin}$ of the input inductor $L_{in}$ through the first auxiliary diode $D_{a1}$. When the first auxiliary diode $D_{a1}$ is conducting, the voltage $V_{Cr}$ across the snubber capacitor $C_r$ is applied to the snubber inductor $L_r$ and, consequently, the current $I_{Lr}$ of the snubber inductor $L_r$ begins to increase. The current $I_{da1}$ in the first auxiliary diode $D_{a1}$ will also charge the snubber capacitor $C_r$. When the current $I_{Lr}$ of the snubber inductor $L_r$ reaches the current $I_{Lin}$ of the input inductor $L_{in}$ at the time $t_6$, the first auxiliary diode $D_{a1}$ is transitioned off and the voltage $V_{Cr}$ across the snubber capacitor $C_r$ remains constant. During this period, the drain-to-source voltage $V_{ds1}$ of the power switch Q1 is substantially equivalent to the voltage $V_{Cr}$ across the snubber capacitor $C_r$.

During a transition the auxiliary switch Q2 to a non-conducting state period (the period between a time $t_6$ and a time $t_7$), the voltages and currents of the boost converter 300 remain relatively constant until the auxiliary switch Q2 is turned off (at the time $t_7$). The drain-to-source voltage $V_{ds1}$ of the power switch Q1 is maintained at or near zero. After the auxiliary switch Q2 is transitioned to the non-conducting state, the current $I_{Lr}$ of the snubber inductor $L_r$ is conducted by the second auxiliary diode $D_{a2}$ until the snubber capacitor $C_r$ is completely discharged. Thereafter, the current $I_{Lr}$ of the snubber inductor $L_r$ is conducted by the power diode D. Also, the drain-to-source voltages $V_{ds1}$, $V_{ds2}$ of the power switch Q1 and auxiliary switch Q2, respectively, are charged-up when the auxiliary switch Q2 is transitioned to the non-conducting state. Finally, during the period designated by time $t_8$ to time $t_{0+Ts}$, the energy is delivered to the output through the power diode D analogous to the off period of the conventional boost converter.

As a result of the circuit of the present invention, the following advantages are provided. The reverse recovery energy is transferred to and recovered by the snubber capacitor $C_r$ and then delivered to the output of the boost converters 300, 400, 500 when the auxiliary switch Q2 is turned off. The current $I_{Lr}$ in the snubber inductor $L_r$ (after the power switch Q1 is transitioned to the non-conducting state) is determined primarily by the conduction period of the auxiliary switch Q2. Also, the current $I_{da1}$ in the first auxiliary diode $D_{a1}$ will be at or near zero prior to the auxiliary switch Q2 being transitioned to the non-conducting state. However, a very short conduction time for the auxiliary switch Q2 may be sufficient to charge-up the snubber capacitor $C_r$ such that the energy stored therein will adequately rebuild the current $I_{Lr}$ in the snubber inductor $L_r$.

Additionally, since the current $I_{Lin}$ in the input inductor $L_{in}$ is carried by the auxiliary switch Q2 between the period represented by the time $t_5$ and the time $t_6$, and the drain-to-source voltage $V_{ds1}$ of the power switch Q1 is maintained at or near the voltage $V_{Cr}$ across the snubber capacitor $C_r$ (which is typically small, e.g., 30–50 volts), the power switch Q1 can be an insulated gate bipolar transistor ("IGBT") . Again, IGBTs exhibit switching losses resulting from a tail current at the turn-off thereof. The present invention reduces the collector and emitter voltage of the IGBT during the tail current period thereby reducing the switching losses associated therewith. Of course, the scope of the present invention is not limited by the type of switch employed therewith.

Figure 7:
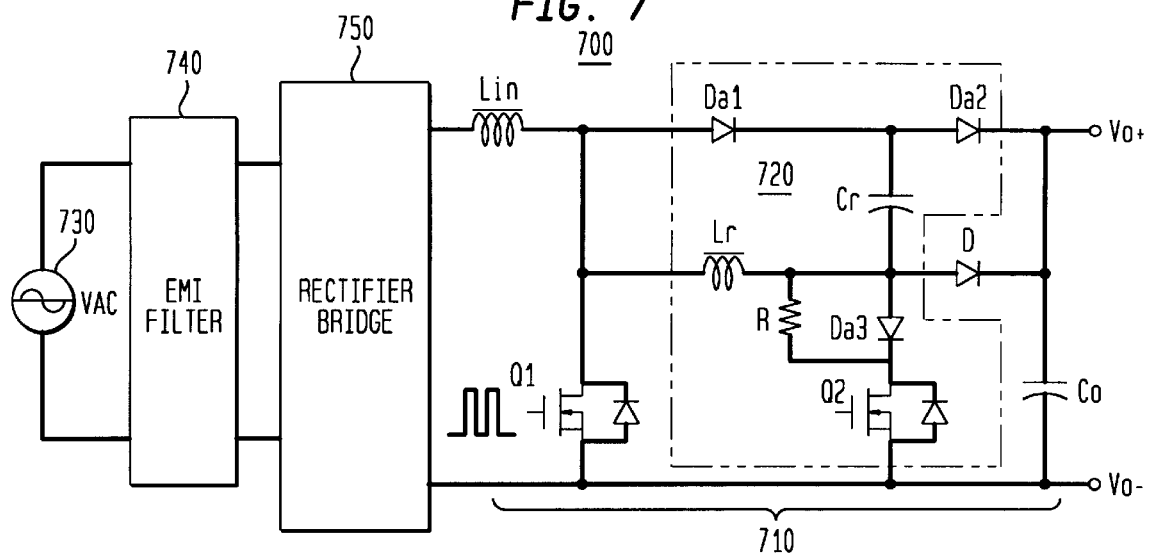
FIG. 7 illustrates a schematic diagram of an embodiment of a power supply employing another embodiment of a circuit constructed according to the principles of the present invention.

Turning now to FIG. 7, illustrated is a schematic diagram of an embodiment of a power supply 700 employing another embodiment of a circuit 720 constructed according to the principles of the present invention. The power supply 700 includes a boost power converter (or boost converter) 710 employing the circuit 720. The power supply 700 also includes an input source of electrical power 730, an electromagnetic interference ("EMI") filter 740 and a rectifier bridge 750. The power supply 700 provides a voltage $V_o$ at the output thereof. The circuit 720 includes a snubber circuit (including a snubber inductor $L_r$, a snubber capacitor $C_r$, a first, second and third auxiliary diode $D_1$, $D_2$, $D_3$ and a resistor R) and an auxiliary switch Q2. The circuit 720 operates analogously to the circuits previously illustrated and described with respect to the foregoing FIGUREs. Additionally, the boost converter 710 may be directly coupled to any DC source without employing the EMI filter 740 and rectifier bridge 750.

Figure 8:
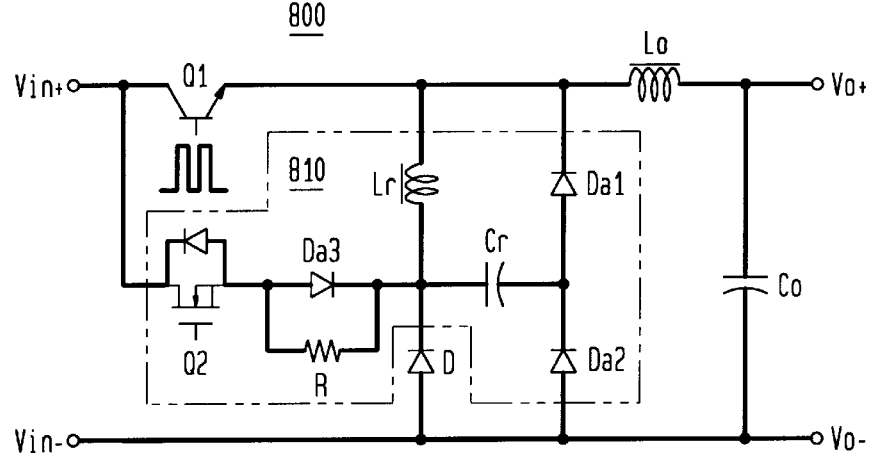
FIG. 8 illustrates a schematic diagram of an embodiment of a buck power converter employing another embodiment of a circuit constructed according to the principles of the present invention.

Turning now to FIG. 8, illustrated is a schematic diagram of an embodiment of a buck power converter (buck converter) 800 employing another embodiment of a circuit 810 constructed according to the principles of the present invention. The buck converter 800 includes an input voltage source $V_{in}$, a power switch Q1, a rectifier (e.g., a power diode D), an inductor $L_o$, a capacitor $C_o$ and the circuit 810. The buck converter 800 provides a voltage $V_o$ at the output thereof. The circuit 810 includes a snubber circuit (including a snubber inductor $L_r$, a snubber capacitor $C_r$, a first, second and third auxiliary diode $D_{a1}$, $D_{a2}$, $D_{a3}$ and a resistor R) and an auxiliary switch Q2. The circuit 810 operates analogously to the circuits previously illustrated and described with respect to the foregoing FIGUREs.

Figure 9:
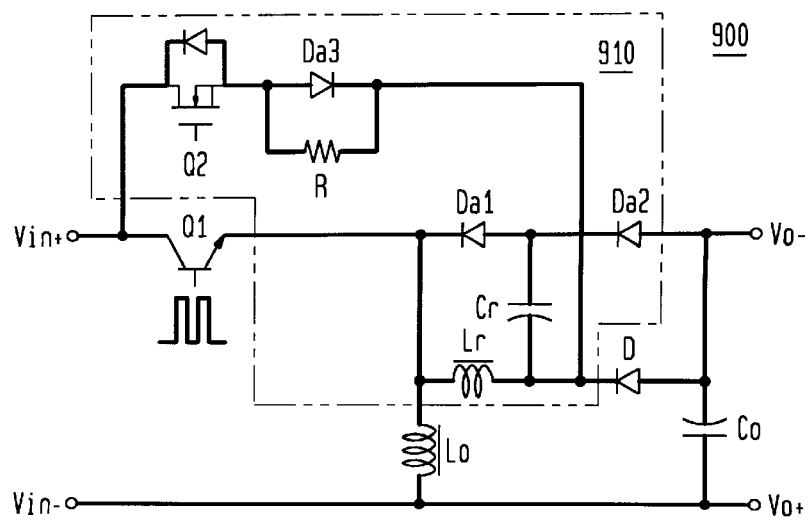
FIG. 9 illustrates a schematic diagram of an embodiment of a buck-boost power converter employing another embodiment of a circuit constructed according to the principles of the present invention.

Turning now to FIG. 9, illustrated is a schematic diagram of an embodiment of a buck-boost power converter (buck-boost converter) 900 employing another embodiment of a circuit 910 constructed according to the principles of the present invention. The buck-boost converter 900 includes an input voltage source $V_{in}$, a power switch Q1, a rectifier (e.g., a power diode D), an inductor $L_o$, a capacitor $C_o$ and the circuit 910. The buck converter 900 provides a voltage $V_o$ at the output thereof. The circuit 910 includes a snubber circuit (including a snubber inductor $L_r$, a snubber capacitor $C_r$, a first, second and third auxiliary diode $D_{a1}$, $D_{a2}$, $D_{a3}$ and a resistor R) and an auxiliary switch Q2. The circuit 910 operates analogously to the circuits previously illustrated and described with respect to the foregoing FIGUREs.

Those skilled in the art should understand the general operation of the previously introduced converters 700, 800, 900 and, as a result, detailed explanations of the respective operations are not included herein. Of course, those skilled in the art should understand that the previously described embodiments of the circuit (and converter topologies ann power supplies employed therewith) are submitted for illustrative purposes only, and other embodiments capable of reducing a peak reverse recovery current of a rectifier employing an auxiliary switching device are well within the broad scope of the present invention. For a better understanding of power electronics, power converter topologies, such as the boost power converter, and snubber circuits see *Principles of Power Electronics,* by J. Kassakian, M. Schlecht, Addison-Wesley Publishing Company (1991), *High Efficiency Telecom Rectifier Using a Novel Soft-Switching Boost-Based Input Current Shaper,* by R. Streit, D. Tollik, IEEE Intelec Conference Records, pages 720–726 (1991), *Novel Zero-Voltage-Transition PWM Converters,* by G. Hua, C. S. Leu, F. C. Lee, IEEE Power Electronics Specialists Intelec Conference Records, pages 55–61 (1992), *Soft Transitions Power Factor Correction Circuit,* by I. D. Jitaru, In the Proceedings of HFPC, pages 202–208 (1993, U.S. Pat. No. 5,313,382, entitled *Reduced Voltage/Zero Current Transition Boost Power Converter,* by R. Farrington, issued May 17, 1994 and commonly assigned with the present invention. The aforementioned references are herein incorporated by reference.

Although the present invention has been described in detail, those skilled in the art should understand that they can make various changes, substitutions and alterations herein without departing from the spirit and scope of the invention in its broadest form.

What is claimed is:

1. In a power converter having a power train that includes a power switch and a rectifier for conducting forward currents from said power switch, a circuit that moderates a peak reverse recovery current of said rectifier, comprising:

a snubber circuit coupled to said rectifier and including a snubber inductor, a snubber capacitor and an auxiliary diode, said snubber inductor reducing said peak reverse recovery current of said rectifier and said snubber capacitor recovering energy stored in said snubber inductor; and an auxiliary switch, coupled in parallel with said power switch, that is activated when said power switch is transitioned from a conducting state to a non-conducting state to charge said snubber capacitor.

2. The circuit as recited in claim 1 wherein said auxiliary switch is deactivated following expiration of a predetermined period of time.

3. The circuit as recited in claim 1 wherein said snubber circuit further comprises another auxiliary diode for conducting said forward currents prior to said snubber capacitor being fully discharged.

4. The circuit as recited in claim 1 wherein said power switch is an insulated gate bipolar transistor (IGBT) that exhibits a tail current that causes switching losses in said IGBT, said auxiliary switch altering a voltage across said IGBT to reduce said switching losses.

5. The circuit as recited in claim 1 wherein said rectifier includes a power diode.

6. The circuit as recited in claim 1 further comprising a resistor that discharges a voltage across said auxiliary switch when said auxiliary switch is in a non-conducting state.

7. The circuit as recited in claim 1 further comprising a Zener diode that recovers energy from said auxiliary switch to said snubber capacitor when said auxiliary switch is in a non-conducting state.

8. In a power converter having a power train that includes a power switch and a rectifier for conducting forward currents from said power switch, a method of moderating a peak reverse recovery current of said rectifier, comprising the steps of:

reducing said peak reverse recovery current of said rectifier with a snubber inductor;

recovering energy stored in said snubber inductor with a snubber capacitor; and activating an auxiliary switch coupled in parallel with said power switch when said power switch is transitioned from a conducting state to a non-conducting state to charge said snubber capacitor.

9. The method as recited in claim 8 further comprising the step of deactivating said auxiliary switch following expiration of a predetermined period of time.

10. The method as recited in claim 8 further comprising the step of conducting said forward currents through another auxiliary diode prior to said snubber capacitor being fully discharged.

11. The method as recited in claim 8 wherein said power switch is an insulated gate bipolar transistor (IGBT) that exhibits a tail current that causes switching losses in said IGBT, the method further comprising the step of altering a voltage across said IGBT to reduce said switching losses.

12. The method as recited in claim 8 wherein said rectifier comprises a power diode.

13. The method as recited in claim 8 further comprising the step of discharging a voltage across said auxiliary switch when said auxiliary switch is in a non-conducting state.

14. The method as recited in claim 8 further comprising the step of recovering energy from said auxiliary switch to said snubber capacitor when said auxiliary switch is in a non-conducting state.

15. A power supply, comprising:

an input source of electrical power;

a power converter, coupled between said input source and an output, including:

a power switch, and a power diode for conducting forward currents from said power switch; and a circuit for moderating a peak reverse recovery current of said power diode, including:

a snubber circuit coupled to said power diode and including a snubber inductor, a snubber capacitor and an auxiliary diode, said snubber inductor reducing said peak reverse recovery current of said power diode and said snubber capacitor recovering energy stored in said snubber inductor; and an auxiliary switch, coupled in parallel with said power switch, that is activated when said power switch is transitioned from a conducting state to a non-conducting state to charge said snubber capacitor.

16. The power supply as recited in claim 15 further comprising an input electromagnetic interference (EMI) filter and input rectifier coupled between said input source of electrical power and said power converter, said power converter further comprising an output filter coupled to said output.

17. The power supply as recited in claim 15 wherein said power converter further comprises an input inductor for storing energy from said input source of electrical power to be delivered to said output.

18. The power supply as recited in claim 15 wherein said snubber circuit further comprises:
   another auxiliary diode for conducting said forward currents prior to said snubber capacitor being fully discharged; and
   a resistor for discharging a voltage across said auxiliary switch when said auxiliary switch is in a non-conducting state.

19. The power supply as recited in claim 15 wherein said power switch is an insulated gate bipolar transistor (IGBT) that exhibits a tail current that causes switching losses in with said IGBT, said auxiliary switch altering a voltage across said IGBT to reduce said switching losses.

20. The power supply as recited in claim 15 wherein said power converter is selected from the group consisting of:
   a boost converter;
   a buck converter; and
   a buck-boost converter.

\* \* \* \* \*